United States Patent [19]

Rossi

[11] Patent Number: 4,969,247

[45] Date of Patent: Nov. 13, 1990

[54] CRYOGENIC ELECTRODE REPLACEMENT

[75] Inventor: Cristiano G. Rossi, Birmingham, Mich.

[73] Assignee: Chrysler Corporation, Highland Park, Mich.

[21] Appl. No.: 461,910

[22] Filed: Jan. 8, 1990

[51] Int. Cl.$^5$ .............................................. B23P 19/02
[52] U.S. Cl. .................... 29/426.4; 29/426.5; 29/426.6
[58] Field of Search .................. 29/426.4, 426.5, 426.6

[56] References Cited

U.S. PATENT DOCUMENTS

| | | | |
|---|---|---|---|
| 3,961,853 | 6/1976 | Grimpe | 29/426.4 X |
| 4,274,576 | 6/1981 | Shariff | 29/426. 4 X |
| 4,408,382 | 10/1983 | Campbell | 29/426.1 |
| 4,409,731 | 10/1983 | Campbell | 29/426.4 X |

Primary Examiner—Timothy V. Eley
Attorney, Agent, or Firm—Edward A. Craig

[57] ABSTRACT

The present invention is an improved method for replacing worn electrode welding tips on welding robots. The method provides a way in which to apply the subfreezing temperatures of liquid nitrogen to the welding tip while heating a shank on the robot which holds the tip. This results in a temperature gradient between the contacting surfaces of the tip and the shank which will result in an expansion of the shank and a shrinkage of the tip so that the tip can be easily separated from the shank. The process may be fully automated.

5 Claims, 1 Drawing Sheet

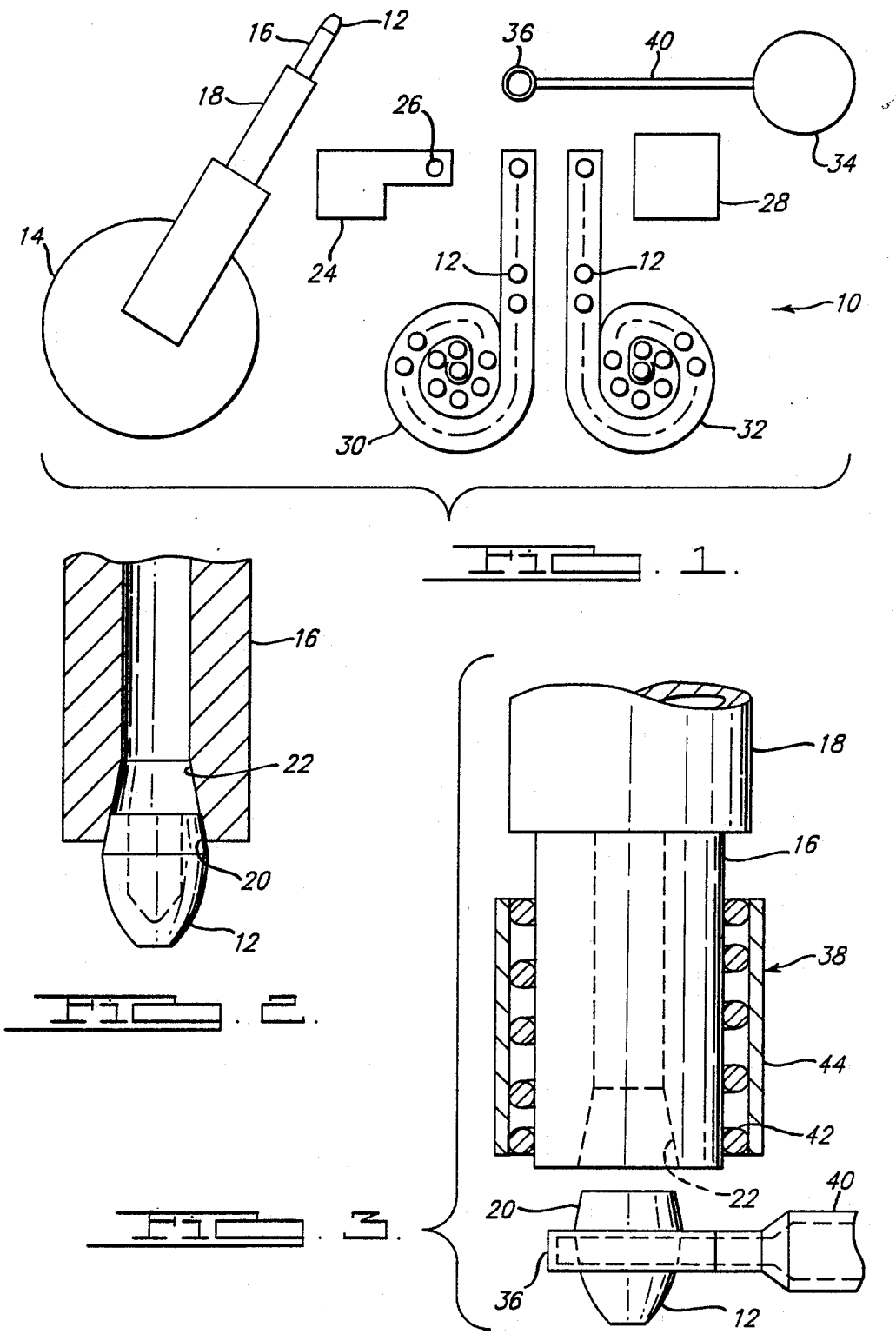

CRYOGENIC ELECTRODE REPLACEMENT

BACKGROUND AND SUMMARY OF THE INVENTION

The present invention relates generally to electrode welding tips, and more particularly, to a method for replacing worn welding electrode tips which are used in robotic welding assembly processes.

Various industries, and particularly the automobile industry, use robots to perform various functions, one of which is welding. After prolonged usage, the electrode welding tips must be reformed or replaced with a new tip. Previously, this has been accomplished by manually removing the tips from the robots. One method of doing this was simply gripping the electrode tip with a pair of pliers and either pulling or pounding on the pliers with a hammer to free the tip from the shank. This can be time consuming and could potentially damage the welding tip shank or even the robot.

Currently, a need exists for improving the method by which these tips are regenerated or replaced. A method is needed which minimizes manual involvement and which lessens the chance for damage to the robot.

The present invention provides a method for replacing electrode welding tips on robots which is designed to satisfy the aforementioned needs. The method of the present invention includes chilling the tip with liquid nitrogen while heating the shank with an electric coil. This results in the tip shrinking and the shank expanding, enabling the robot to pull away from the tip as the tip is being held in specially designed clamps. A welding robot can be programmed to automatically maneuver the tip into the clamps and the shank into a heating coil. The clamps may be automated and controlled by another robot to grip the tip. The clamps also contain conduits carrying liquid nitrogen for freezing the tip. The foregoing and other objects and advantages will become more apparent when viewed in light of the accompanying drawings and following detailed description.

BRIEF DESCRIPTION OF THE DRAWINGS

FIG. 1 is a schematic top view of various operations and components required therefore which may be involved in the reshaping or replacement of electrode welding tips in accordance with the present invention;

FIG. 2 is a partial section view of an electrode welding tip secured within a shank of a robot arm; and FIG. 3 is an elevational view showing the arrangement of the shank and tip within the coil and clamps respectively, to accomplish the method of the present invention for removing the electrode welding tip from the shank.

DESCRIPTION OF A PREFERRED EMBODIMENT

Referring to FIG. 1, there is shown a setup 10 for replacing or reshaping electrode welding tips 12 used on a programmable robot 14 to weld various parts together, such as parts of a vehicle being built on an assembly line. The welding tips 12 are usually compressively forced into a shank 16 of a robot arm 18.

Referring to FIG. 2, there is shown the shank 16 with the tip 12 held in place. It will be seen that the tip 12 has a frusta-conical shaped end 20 which compressively fits into a mating frusta-conical shaped hollowed section 22 of the shank 16. The manner in which the tip 12 is compressed into the shank 16 is well known to one of ordinary skill in the art.

Once a tip 12 has been used many times, it will begin to wear and must be either reshaped or replaced. As shown in FIG. 1, a tip dresser 24 is provided near the robot 14 for the robot 14 to maneuver the tip 12 into an opening 26 in the tip dresser 24 where the tip 12 may be dressed. Tip dressers, in general, are known to those of ordinary skill in the art. A reforming unit 28 is also provided for the robot 14 to maneuver the tip 12 into the reforming unit 28 so that the worn tip may be reshaped to be used again. The reforming unit 28 is also known to one of ordinary skill in the art and basically consists of a small die in a small press.

Also shown in FIG. 1 are two separate feeder trays 30, 32. Feeder tray 30 holds a quantity of new electrode welding tips 12 while feeder tray 32 holds a quantity of regenerated electrode welding tips 12. The feeder trays 30, 32 are known to one of ordinary skill in the art and are designed to allow the tips 12 to move down the tray once a tip 12 at the end of the trays 30, 32 is removed by the robot 14. The tips 12 are usually manually placed in the trays 30, 32.

Situated within the reach of the robot 14, is a liquid nitrogen source 34, for providing liquid nitrogen to a clamp 36 which will grip the tips 12 and dramatically reduce the temperature of the tips 12. While the liquid nitrogen clamp 36 is cooling a tip 12, the shank 16 of the robot arm 18 will be positioned inside a heating coil 38. In the preferred embodiment, a conduit 40 is provided to enable the liquid nitrogen to pass from the source 34 into the clamp 36. As the shank 16 is being heated, it will tend to expand and as the tip 12 is being cooled it will tend to shrink. Once this process has occurred, the robot arm 18 can simply lift the shank 16 while the clamp 36 is holding the tip 12 and easy separation of the tip 12 and shank 16 will occur.

Of course, many variations could be incorporated into this process to achieve the same result. The heating coil 38 could be replaced by many different heating elements which would serve the same function. The liquid nitrogen clamp 36 could also be replaced with various other means for cooling the tip 12 and holding the tip 12 while the shank 16 is pulled away.

The electric heating coil 38 has a wound heating filament 42 which may be protectively surrounded by a hollow cylindrical shield 44 made of a heat resistent material such as ceramics. Wiring from the heating coil 38 could be plugged into any typical electrical outlet for providing the electricity needed to heat the filament 42. It is also conceivable that the heating coil 38 may not be necessary if a means can be provided to prevent the simultaneous cooling of the tip 12 and the shank 16 by the liquid nitrogen. In order for the tip 12 to separate easily from the shank 16 a temperature gradient must exist between the tip 12 and the shank 16. A device which insulates the shank 16 from the cooling of the tip 12 may alleviate the need for a heating coil 38.

After separating the tip 12 from the shank 16, the clamp 36 will move the tip 12 to a receptacle for discarding or salvage. The clamp 36 will then return to its original position underneath the heating coil 38 to await the robot 14 to move the next tip 12 into the clamps 36 for replacement. After the tip 12 has been removed from the shank 16, the robot arm 18 will continue to move upward thereby lifting the shank 16 out of the coil 38. The robot 14 will then moves its arm 18 over one of the trays 30, 32 so that the shank 16 may be fitted with a new tip 12. With respect to FIG. 1, the tip dresser 24, the reforming unit 28, and the trays 30,32, in addition to the heating coil 38 and clamp 36, are all within reaching distance of robot 14.

It is thought that the method of the present invention and many of its attendant advantages will be understood from the foregoing description and it will be apparent that various changes may be made in the form and construction of the components thereof without departing from the spirit and scope of the invention or sacrificing all of its material advantages, the form hereinbefore described being merely a preferred or exemplary embodiment thereof.

What is claimed is:

1. A method for removing an electrode welding tip from a shank wherein said tip is compressively held, said method comprising:
    cooling said tip while heating said shank thereby causing said shank to expand slightly and causing said tip to shrink slightly so that said tip may be easily separated from said shank.

2. The method of claim 1, wherein cooling said tip is accomplished by the process of cryogenics using liquid nitrogen.

3. The method of claim 2, wherein cooling said tip with liquid nitrogen is accomplished by gripping said tip with a clamp, said clamp having a conduit therein for carrying said liquid nitrogen, said clamp made of a material capable of conduction of sub-freezing temperatures to said tip.

4. The method of claim 1, wherein heating said shank is accomplished by positioning said shank inside a heating coil.

5. An automated method for separating an electrode welding tip from a shank wherein said tip is compressively held, said shank extending from an arm of a welding robot, said method comprising:
    chilling a clamp with liquid nitrogen;
    heating a coil;
    aligning said coil with said clamp;
    maneuvering said robot arm until said shank is positioned within said coil and at the same time said tip is positioned within said clamp;
    gripping said tip with said clamp thereby lowering the temperature of said tip resulting in slight shrinkage of said tip;
    heating said shank with said coil thereby increasing the temperature of said shank resulting in slight expansion of said shank; and
    maneuvering said robot arm while gripping said tip with said clamp to pull apart said tip from said shank.

* * * * *